(12) United States Patent
Zhang et al.

(10) Patent No.: US 11,841,274 B2
(45) Date of Patent: *Dec. 12, 2023

(54) POLARITONIC FIBER PROBE AND METHOD FOR NANOSCALE MEASUREMENTS

(71) Applicant: BAYLOR UNIVERSITY, Waco, TX (US)

(72) Inventors: Zhenrong Zhang, Waco, TX (US); Blake Birmingham, Waco, TX (US); Khant Minn, Chandler, AZ (US)

(73) Assignee: BAYLOR UNIVERSITY, Waco, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/498,459

(22) Filed: Oct. 11, 2021

(65) Prior Publication Data

US 2022/0026281 A1 Jan. 27, 2022

Related U.S. Application Data

(63) Continuation-in-part of application No. 16/886,169, filed on May 28, 2020, now Pat. No. 11,150,141.

(Continued)

(51) Int. Cl.
*G01Q 60/22* (2010.01)
*G01J 5/0821* (2022.01)
*G01J 5/48* (2022.01)

(52) U.S. Cl.
CPC ............ *G01J 5/0821* (2013.01); *G01Q 60/22* (2013.01); *G01J 5/485* (2022.01)

(58) Field of Classification Search
CPC ................................ G01Q 60/18; G01Q 60/22
See application file for complete search history.

(56) References Cited

U.S. PATENT DOCUMENTS 9,964,494 B1 5/2018 Poole et al.
11,150,141 B2 * 10/2021 Zhang .................... G02B 6/105
(Continued)

FOREIGN PATENT DOCUMENTS

WO 2019165715 A1 9/2019

OTHER PUBLICATIONS

Boriskina, Svetlana V., Tong, Jonathan K., Huang, Yi, Zhou, Jiawei, Chiloyan, Vazrik, Chen, Gang, "Enhancement and Tunability of Near-Field Radiative Heat Transfer Mediated by Surface Plasmon Polaritons in Thin Plasmonic Films", Photonics, Jun. 18, 2015, pp. 659-683, vol. 2; doi: https://doi.org/10.3390/photonics2020659.

(Continued)

*Primary Examiner* — Eliza W Osenbaugh-Stewart
(74) *Attorney, Agent, or Firm* — Jackson Walker LLP

(57) ABSTRACT

The invention offers high resolution and accuracy for nanoscale device characterization from ultraviolet through microwave wavelengths. Instead of collecting light after emission in near-field that decays to far-field, the present invention directly couples the near-field waves to a polaritonic-coated probe. The polaritonic coating can be formed on an wavelength tuned optical fiber to receive the coupled emission and form polaritons, including plasmons, phonons, and magnons, using the polaritonic material. The polaritons propagate along the probe decay back into the fiber core without substantial losses to far-field and are transmitted to a detector, such as a spectroscope. The coupling of the near-field energy to emission detected through the tip apex of fiber can be expressed as emission spectra. Through mapping with other spatial points, multi-dimensional displays and other information can be provided. The resolution can be less than 100 nanometers, including an order of magnitude less than 100 nanometers.

10 Claims, 16 Drawing Sheets
(15 of 16 Drawing Sheet(s) Filed in Color)

Related U.S. Application Data

(60) Provisional application No. 62/854,855, filed on May 30, 2019.

(56) References Cited

U.S. PATENT DOCUMENTS

2005/0232544 A1    10/2005    Blumberg
2016/0077127 A1    3/2016    Fiorini et al.

OTHER PUBLICATIONS

Ding, W., Andrews. S.R., Maier, S.A., "Internal excitation and superfocusing of surface plasmon polaritons on a silver-coated optical fiber tip", Physical Review A, Jun. 25, 2007, vol. 75, No. 6; doi: https://doi.org/10.1103/PhysRevA.75.063822.

De Wilde, Y., Formanek, F., Carminati, R., Gralak, B., Lemoine, P.A. Joulain, K., Mulet, J.P., Chen, Y., Greffet, J.J., "Thermal radiation scanning tunnelling microscopy", Nature 444, (2006), pp. 740-743, vol. 444, No. 7120; https://doi.org/10.1038/nature05265.

Jones, A.C., Raschke, M.B., "Thermal Infrared Near-Field Spectroscopy", NANO Letters, Feb. 8, 2012, pp. 1475-1481, vol. 12, No. 3; https://doi.org/10.1021/nl204201g.

Kobayashi, Miki, Written Opinion for International Patent Application No. PCT/US2020/035059, dated Nov. 16, 2021.

Zayats, A.V., Smolyaninov, I.I., "Near-field photonics: surface plasmon polaritos and localized surface plasmons", Journal of Optics A: Pure and Applied Optics, (2003), pp. S1-S35, https://www.researchgate.net/publication/231134557_Near-field_photonics_Surface_plasmon_polaritons_and_localized_surface_plasmons.

Komiyama, S. Kajihara, Y., Kosaka, K., Ueda, T., An, Z., "Near-field Nanoscopy of Thermal Evanescent Waves on Metals", Research Gate, (2016), 17 pages, https://www.researchgate.net/publication/289406711.

\* cited by examiner

POLARITONIC FIBER PROBE AND METHOD FOR NANOSCALE MEASUREMENTS

CROSS REFERENCE TO RELATED APPLICATIONS

This application is a continuation-in-part of U.S. application Ser. No. 16/886,169, filed May 28, 2020, which claims the benefit of U.S. Provisional Ser. No. 62/854,855, filed May 30, 2019, and is incorporated fully herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to equipment and related method for measuring temperatures of objects and surfaces. More specifically, the disclosure relates to equipment and related method for measuring and mapping temperatures of an object or surface with nanoscale resolution.

Description of the Related Art

The desire to measure temperatures of objects and surfaces with microscopic resolution, such as with sub-micron resolution, has increased over the last few decades. Some efforts have been made to increase resolution but fall short of the resolution desired.

FIG. 1 is a schematic diagram of a known proposed system for measuring surface temperature with an IR detector. For example, Roodenko, Y., Ephrat, P., Naglia, L., and Katzir, A., *Collection-mode near-field scanning infrared microscope based on silver halide probes*, Appl. Phys. Lett. 85, 5538 (2004), (https://doi.org/10.1063/1.1830674) discloses "a collection-mode scanning near-field microscope [SNIM] for the midinfrared spectral range, employing probes fabricated from tapered silver halide fibers. The system was tested in the photon scanning tunneling regime, where a sample was illuminated under total internal reflection conditions." Abstract. The system uses a laser beam to illuminate a sample under total internal reflection conditions (TIR) at an angle to a vertical datum. A tip of a tapered silver halide fiber has an end facet that can receive near-field IR radiation to pass into the fiber and measures the tunneling power at a distance h from the sample. The end facet needs to be large to receive sufficient energy, but small to have resolution. The competing interests results in a balance that lacks sufficient resolution for current needs.

FIG. 2A is a schematic diagram of another known proposed system for measuring surface temperature with a tip. FIG. 2B is a micro optical photo of an object to measure the surface temperature with the system in FIG. 2A. FIG. 2C is a micro atomic force image of the object in FIG. 2B to measure the surface temperature with the system in FIG. 2A. FIG. 2D is a micro scanning thermal radiation image of the object in FIG. 2B measured with the system in FIG. 2A. Another example is by De Wilde, Y., Formanek, F., Carminati, R., *Thermal radiation scanning tunnelling microscopy*. Nature 444, 740-743 (2006). (https://doi.org/10.1038/nature05265). The article states that "[near-field scanning optical microscopy] NSOM is well suited to study surface waves such as surface plasmons or surface-phonon polaritons. Using an aperture NSOM with visible laser illumination, a near-field interference pattern around a corral structure has been observed, whose features were similar to the scanning tunnelling microscope image of the electronic waves in a quantum corral." Abstract. The article "describes an infrared NSOM that operates without any external illumination: it is a near-field analogue of a night-vision camera, making use of the thermal infrared evanescent fields emitted by the surface, and behaves as an optical scanning tunnelling microscope." Id. In general, it is understood that near-field radiation is scattered by the atomic force microscope (AFM) tip. The tip acts as a scattering center that radiates in the far field a signal linearly related to the infrared evanescent fields emitted by the surface. The scattered near-field signal is differentiated from a constant far-field signal by a lock-in filtering tied to the tapping frequency of the AFM tip. The boundary between a gold disk and a substrate is resolved with 100 nm resolution. The system and method lack the desired resolution and sensitivity for accuracy.

FIG. 3A is a schematic diagram of another known proposed system with a heated AFM near-field scattering setup for measuring surface temperature. FIG. 3B is a set of results in photo form and graph form from the setup shown in FIG. 3A. A third example of prior efforts is by Jones, A, Raschke, M, *Thermal Infrared Near-Field Spectroscopy*. Nano Lett. 2012, 12, 1475-1481 (2012) (https://doi.org/10.1021/nl204201g). The article states, "Despite the seminal contributions of Kirchhoff and Planck describing far-field thermal emission, fundamentally distinct spectral characteristics of the electromagnetic thermal near-field have been predicted. However, due to their evanescent nature, their direct experimental characterization has remained elusive. Combining scattering scanning near-field optical microscopy with Fourier-transform spectroscopy using a heated atomic force microscope tip as both a local thermal source and scattering probe, we spectroscopically characterize the thermal near-field in the mid-infrared. We observe the spectrally distinct and orders of magnitude enhanced resonant spectral near-field energy density associated with vibrational, phonon, and phonon-polariton modes. We describe this behavior and the associated distinct on- and off-resonance nanoscale field localization with model calculations of the near-field electromagnetic local density of states." Abstract. It is understood that heated AFM tip or sample generates thermal evanescent fields. The evanescent fields are scattered by the AFM tip into detectable far-field radiation. The scattered near-field spectrum is collected by a Michelson interferometer detected using an HgCdTe photodiode. The scattered near-field signal is differentiated from constant far-field signal by lock-in filtering tied to the tapping frequency of the AFM tip with a 50 nm spatial resolution. The evanescent thermal near-field signal relates to spectral energy density associated with the EM-LDOS and contains information about phonon-polariton, phonon, and vibrational resonances. Here, too, the system and method lack the desired resolution and sensitivity for accuracy.

FIG. 4 is a schematic graph of a known near-field heat transfer between objects based on distance between the objects. It is believed that at least one reason for the inadequate resolution and sensitivity is the very small distance that the radiant thermal energy exponentially dissipates from the surface, that is, within only a few hundred nanometers. According to St-Gelais, R., Zhu, L., Fan, S. et al., Near-field radiative heat transfer between parallel structures in the deep subwavelength regime. Nature Nanotech 11, 515-519 (2016) (https://doi.org/10.1038/nnano.2016.20), near-field energy is contained just a few hundred nm from the surface and decays exponentially.

FIG. 5A is a schematic diagram showing evanescent near-field waves propagating along a surface before decay. Evanescent EM waves decays a short distance from the surface, no photons emit into space. The direction of energy propagation is often along the surface.

FIG. 5B is a schematic diagram showing far-field waves propagating into space. Far-field waves emit photons that propagate into space, carrying energy far away from the surface.

FIG. 6A is a schematic diagram of near-field, far-field, and very far-field waves on or from the surface. FIG. 6B is a combination of graphs from spectra of the near-field, far-field, and very far-field waves of FIG. 6A. The X-axis of the graphs indicates the angular frequency in radians per second (w, $10^{12}$ s$^{-1}$). The resonant frequency in the bottom panel at $178.7 \times 10^{12}$ s$^{-1}$ is equal to 10.54 micrometers in wavelength. The Y-axis indicates the intensity of spectra based on frequency and position above the surface (I (w, $z_c$)). The top graph is being very far-field at about 1000 um from the surface, the middle graph being far-field at about 2 um from the surface, and the bottom graph being near-field at about 0.1 um from the surface. Near-field radiation is scattered and radiates into far-field regions, carrying energy far away from the surface. Thus, the near-field IR landscape of a surface is far different from the far field landscape related to a surface.

FIG. 9A is a schematic top view of a known microwave co-planar wave probe. FIG. 9B is a photo of an embodiment of the probe with a PCB connection. FIG. 9C is a schematic of the co-planar wave probe formed as a funneling resonator. FIG. 9D is a schematic chart of power spectral density relative to frequencies for the resonator of FIG. 9C. In addition to IR measurements noted above, similar principles of far-field measurement availability and higher resolution near-field emission measurements apply to other wavelengths, including ultraviolet ("UV") to microwave wavelengths. For example, in FIG. 9A and FIG. 9B, a microwave co-planer wave ("CPW") probe can provide near-field nano sized microwaves at its tip 40. The probe can be made into a CPW microwave resonator 38 that funnels the microwaves through an output path 42. Far-field measurements shown in FIG. 9D at the output path 42 show the power density at different frequencies. However, such measurements do not measure the power density at the near field microwave production of the tip 40 on a nano-scale. It would be beneficial to be able to measure near-field emission with the resulting higher resolution.

FIG. 10A is a known scanning electron microscope image of an optical fiber probe for ultraviolet frequencies. FIG. 10B is a mapping result of aluminum gallium nitrogen quantum well structure using the UV fiber probe of FIG. 10A with a lateral resolution exceeding 150 nanometers. FIG. 10C is a schematic chart of spectral density relative to frequencies from the UV fiber probe measurements of the quantum well structure. It would be beneficial to be able to measure higher resolution.

FIG. 11A is a schematic of a known experimental setup for laser pulse through a split-hole resonator. FIG. 11B is a scanning electron microscope image of the split-hole resonator of FIG. 11A. FIG. 11C is a chart of spectra of a second and third harmonics generated by the resonator. A split-hole resonator ("SHR") 46 is formed from a nanorod 48 and a nanohole 50 in a metal nanofilm 52 and generally produces high efficiency of third-harmonics generation and multiphoton luminescence. A short laser pulse 54 is used to excite the SHR 46 and the far-field emission can be measured. It would be beneficial to be able to measure near-field emission with the resulting higher resolution.

While the issues have been identified of the rapid scattering from the surface of evanescent near-field waves and consequential loss, those in the art have attempted to capture the near-field data accurately, the system and methods have eluded those in the field with the level of resolution desired for the needed advancement of the science. There remains a need for a solution that can measure with increased resolution and sensitivity that gathers more of the near-field energy while minimizing losses into far-field space.

BRIEF SUMMARY OF THE INVENTION

The invention offers high resolution and accuracy for nanoscale device characterization from ultraviolet through microwave wavelengths. Instead of collecting light after emission in near-field that decays to far-field, the present invention directly couples the near-field waves to a polaritonic-material coated probe. The polaritonic coating can be formed on an wavelength tuned optical fiber to receive the coupled emission and form polaritons, including plasmons, phonons, and magnons, using the polaritonic material. The polaritons propagate along the probe decay back into the fiber core without substantial losses to far-field and are transmitted to a detector, such as a spectroscope. The coupling of the near-field energy to emission detected through the tip apex of fiber can be expressed as emission spectra. Through mapping with other spatial points, multi-dimensional displays and other information can be provided. The resolution can be less than 100 nanometers, including at least an order of magnitude less than 100 nanometers.

The disclosure provides a system for measuring an object having a surface, comprising: a probe formed of an optical fiber configured to conduct frequency emission from the object comprising: a portion of the optical fiber forming a tip; a polaritonic coating on the optical fiber tip configured to receive near-field energy from the surface and form polaritons responsive to the radiation that propagate along the polaritonic coating; and wherein the fiber is configured to allow the polaritons to decay into the fiber and transmit emission from the decayed polaritons along the fiber.

The disclosure further provides a method of measuring an object, comprising: placing a probe and the object having near-field energy adjacent each other, the probe having a polaritonic coating configured to receive the near-field energy; allowing the near-field energy to form polaritons on the polaritonic coating; allowing the polaritons to propagate along the polaritonic coating; allowing the polaritons to decay and emit energy into the fiber; conducting the emitted energy along the fiber; and detecting the energy in the fiber from the decayed polaritons.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
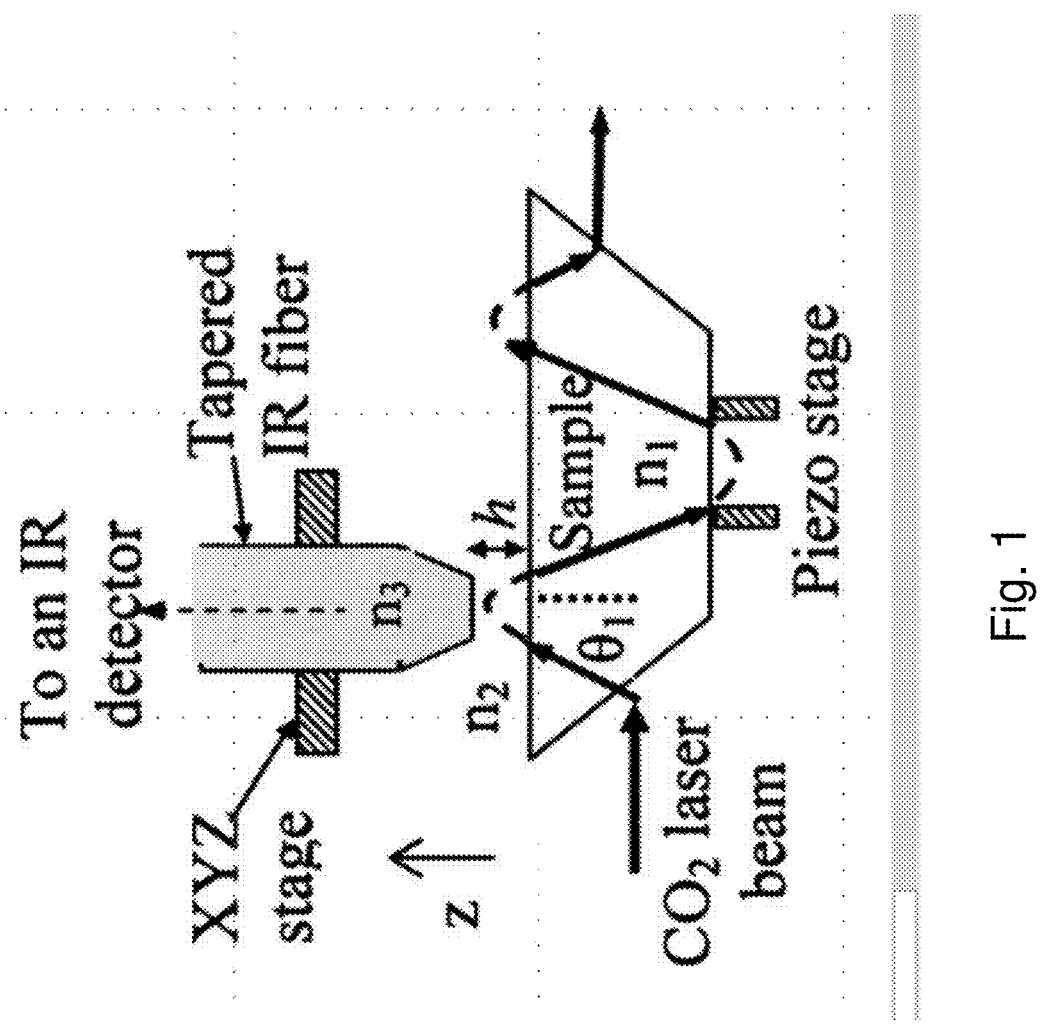
FIG. 1 is a schematic diagram of a known proposed system for measuring surface temperature with an IR detector.
Figure 2B:
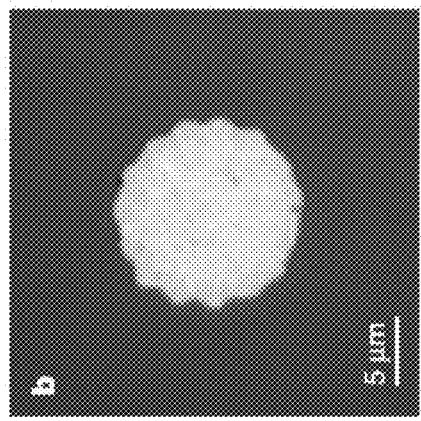
FIG. 2B is a micro optical photo of an object to measure the surface temperature with the system in FIG. 2A.
Figure 2D:
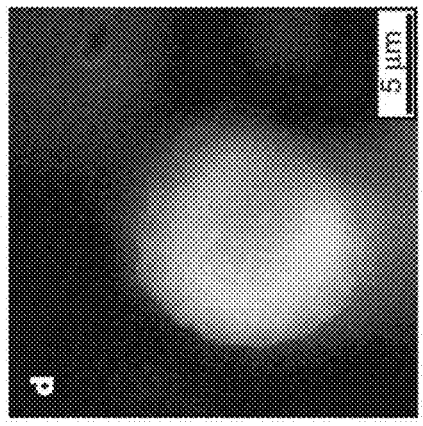
FIG. 2D is a micro scanning thermal radiation image of the object in FIG. 2B measured with the system in FIG. 2A.
Figure 2A:
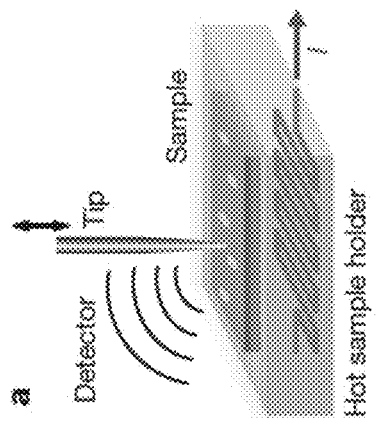
FIG. 2A is a schematic diagram of another known proposed system for measuring surface temperature with a tip.
Figure 2C:
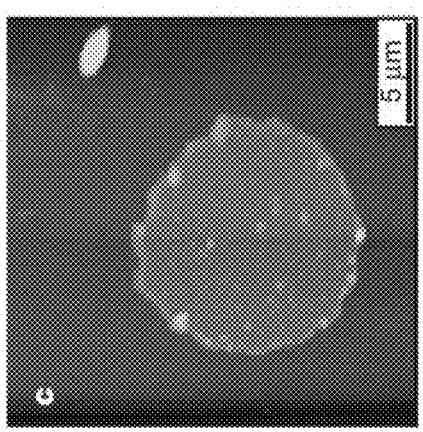
FIG. 2C is a micro atomic force image of the object in FIG. 2B to measure the surface temperature with the system in FIG. 2A.
Figure 3B:
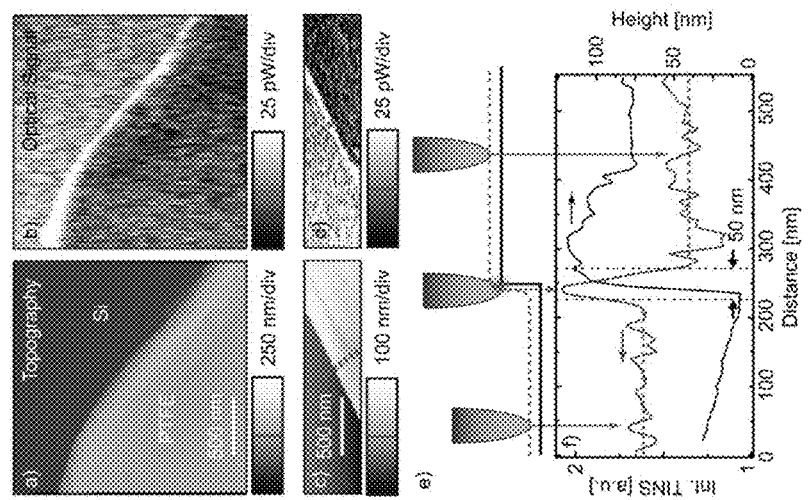
FIG. 3B is a set of results in photo form and graph form from the setup shown in FIG. 3A.
Figure 3A:
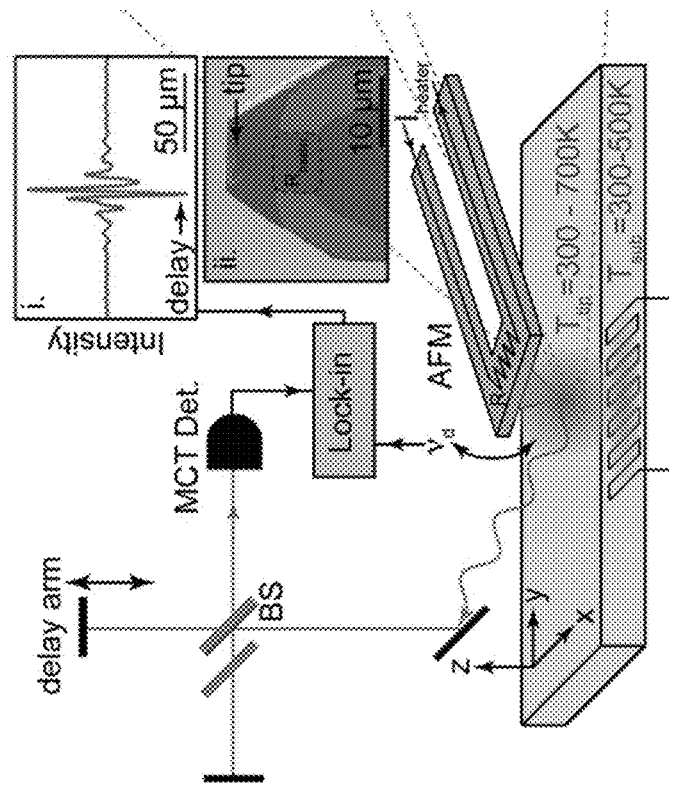
FIG. 3A is a schematic diagram of another known proposed system with a heated AFM near-field scattering setup for measuring surface temperature.
Figure 4:
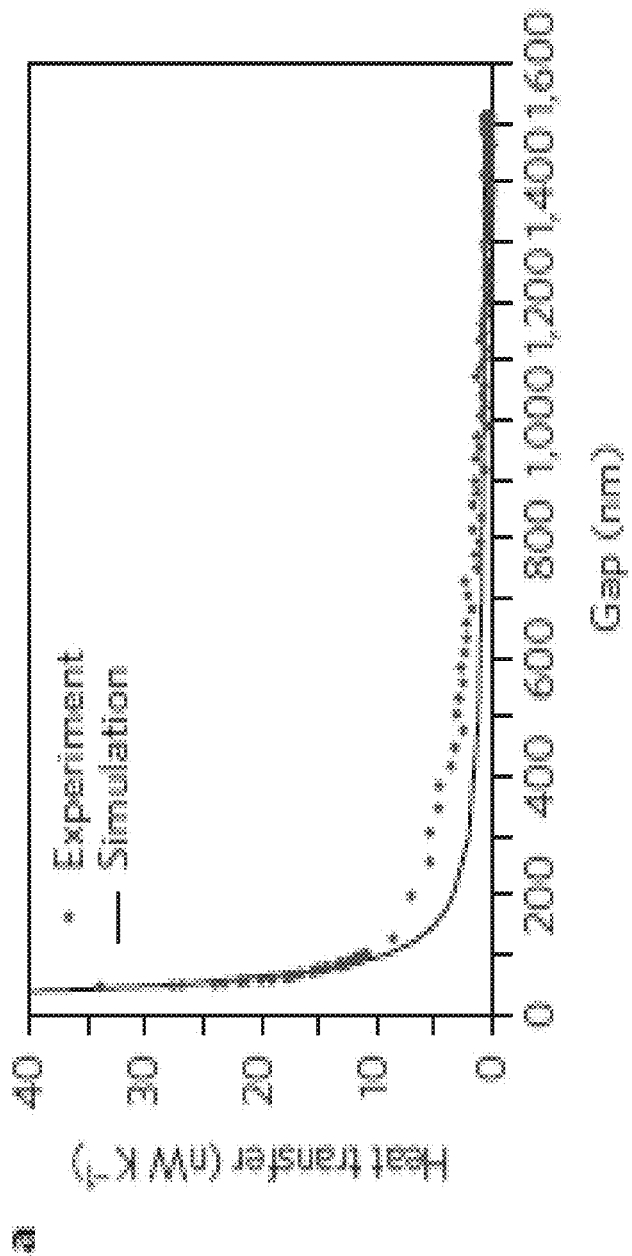
FIG. 4 is a schematic graph of a known near-field heat transfer loss between objects based on distance between the objects.
Figure 5A:
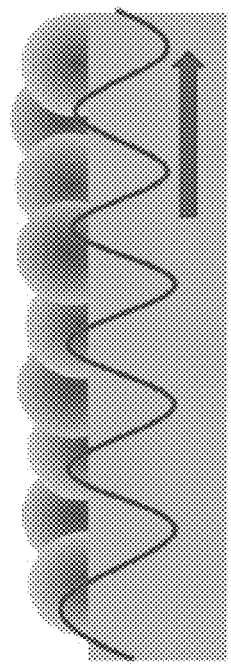
FIG. 5A is a schematic diagram showing evanescent near-field waves propagating along a surface before decay.
Figure 5B:
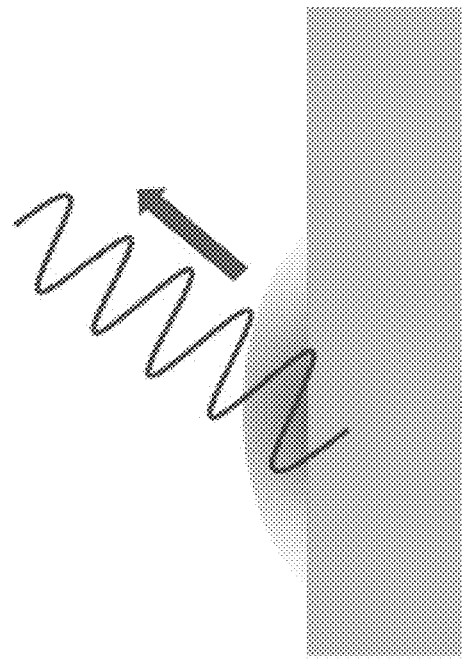
FIG. 5B is a schematic diagram showing far-field waves propagating into space.
Figures 6A, 6B:
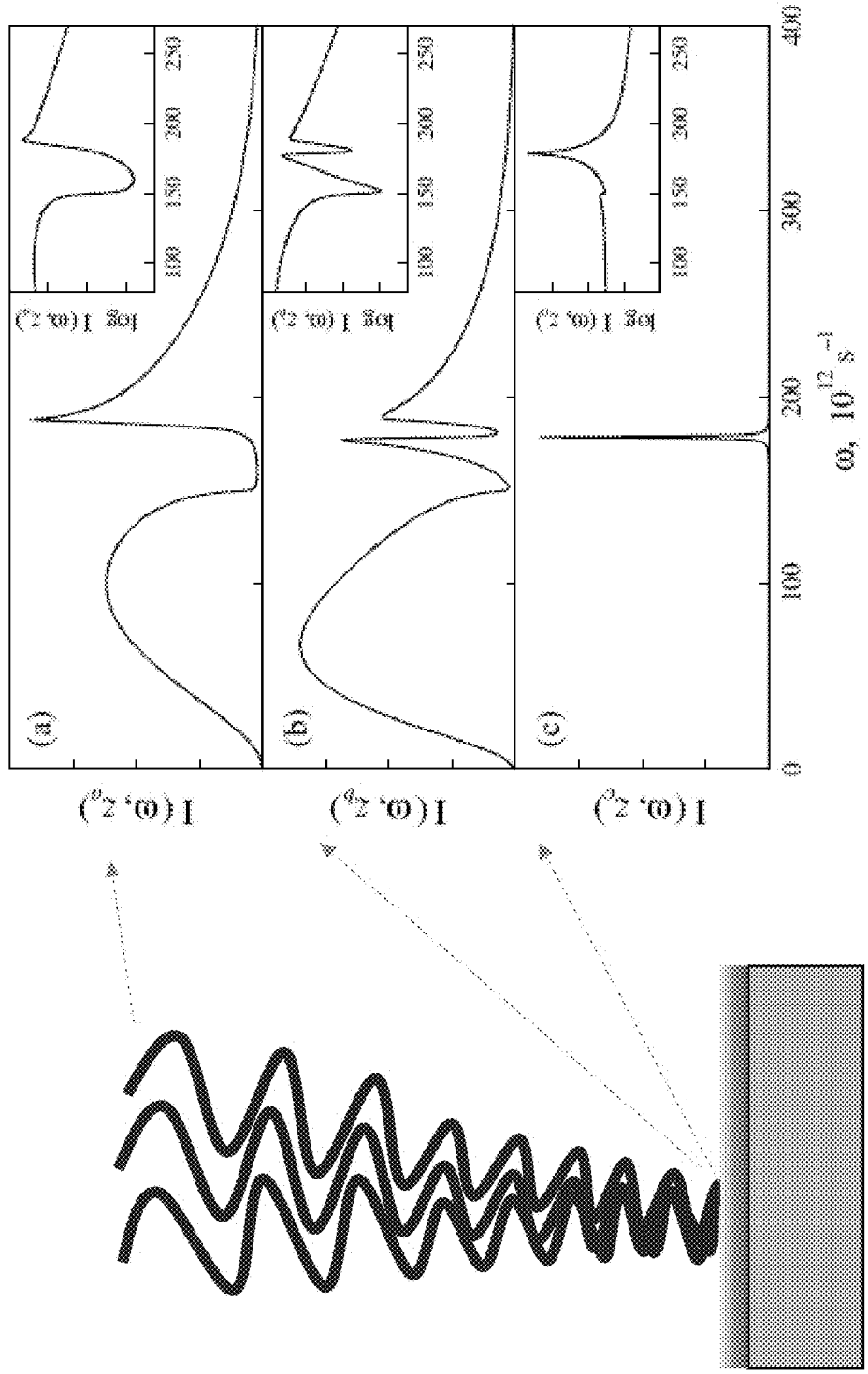
FIG. 6A is a schematic diagram of near-field, far-field, and very far-field waves on or from the surface.
FIG. 6B is a combination of graphs from spectra of the near-field, far-field, and very far-field waves of FIG. 6A.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute relative to a fixed datum such as the earth in commercial use. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

The invention offers high resolution and accuracy for nanoscale device characterization from ultraviolet through microwave wavelengths. Instead of collecting light after emission in near-field that decays to far-field, the present invention directly couples the near-field waves to a polaritonic-coated probe. The polaritonic coating can be formed on an wavelength tuned optical fiber to receive the coupled emission and form polaritons, including plasmons, phonons, and magnons, using the polaritonic material. The polaritons propagate along the probe decay back into the fiber core without substantial losses to far-field and are transmitted to a detector, such as a spectroscope. The coupling of the near-field energy to emission detected through the tip apex of fiber can be expressed as emission spectra. Through mapping with other spatial points, multi-dimensional displays and other information can be provided. The resolution can be less than 100 nanometers, including at least an order of magnitude less than 100 nanometers.

Because the coating is directly on the fiber, the probe can be used in multiple environments, such as liquid, gas, and it is believed even in vivo for nanoscale measurements. Further, the concepts of the polaritonic-coated tip can be integrated into a variety of scanning probe microscopes, including atomic force microscopes ("AFM"), scanning tunneling microscopes ("STM"), near-field scanning optical microscopes ("NSOM"), and others. The invention can be used for nanoscale chemical sensing, temperature sensing, microwave device performance characterization, magnetic imaging, and other foreseeable and unforeseeable purposes. By detecting the near-field signal without substantially emitting to the far-field, the invention is able to acquire previously lost information about nanoscale dynamics.

Figure 7A:
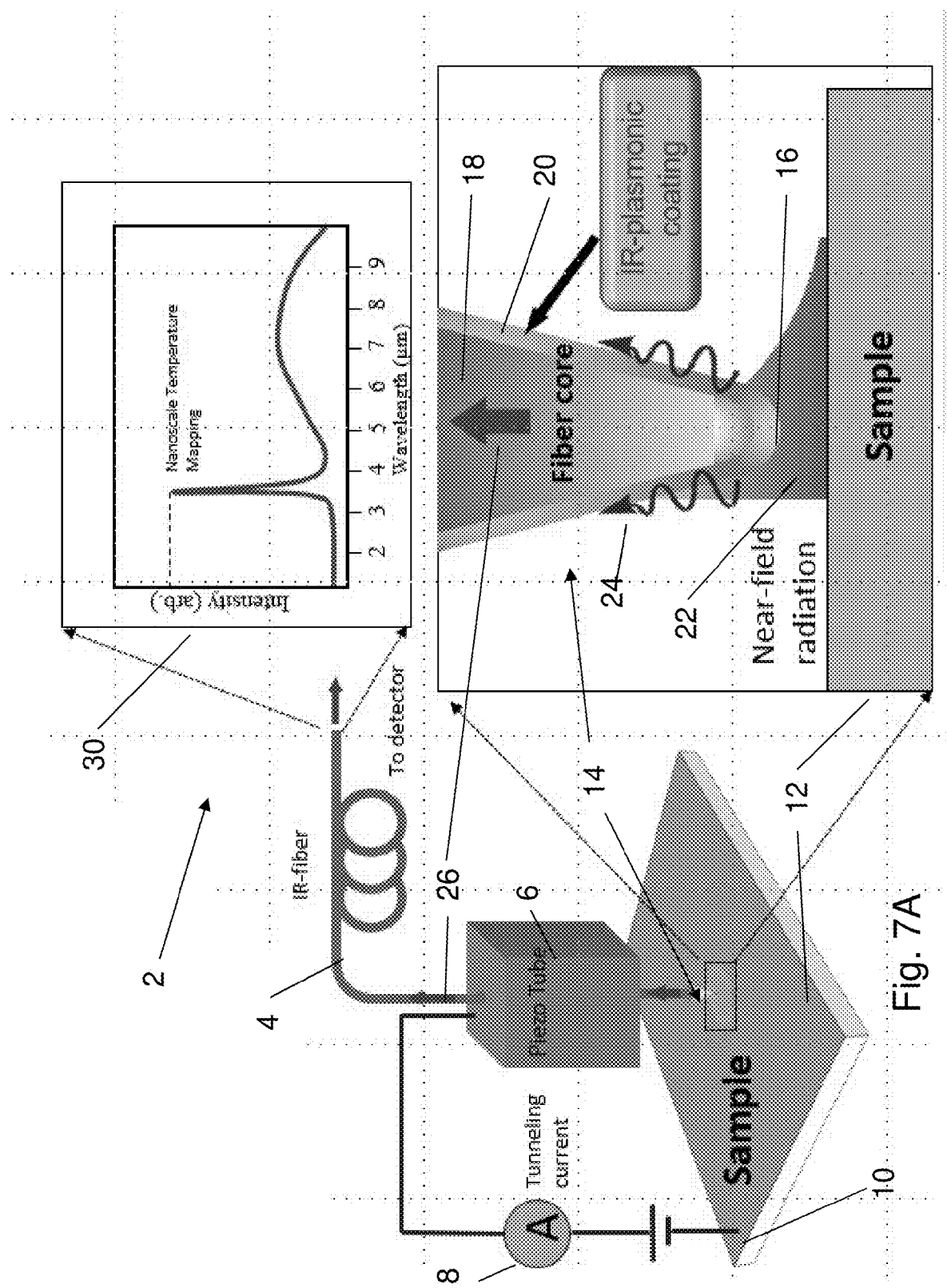
FIG. 7A is a schematic diagram of an illustrative embodiment of an infrared polaritonic fiber probe system capable of nanoscale temperature mapping according to the invention.
Figure 7B:
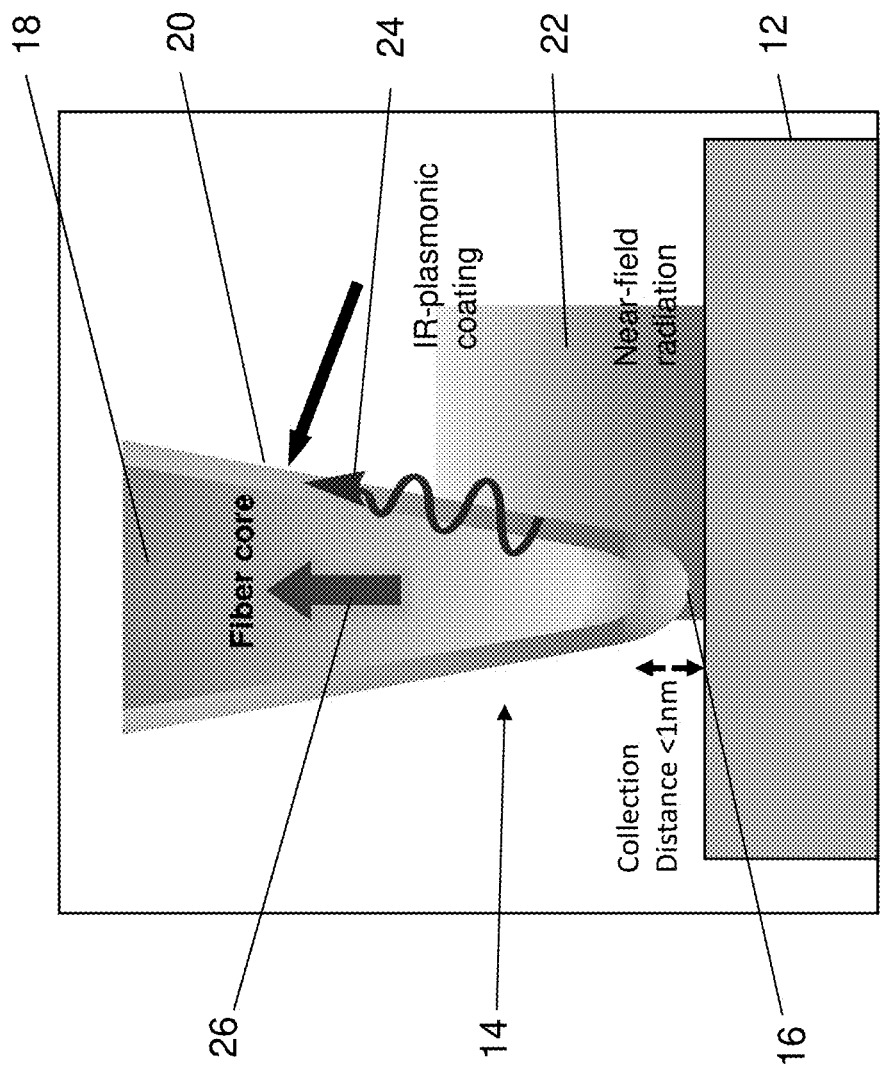
FIG. 7B is an enlarged schematic view of the fiber probe adjacent the surface to be measured of FIG. 7A.

FIG. 7A is a schematic diagram of an illustrative embodiment of an infrared polaritonic fiber probe system capable of nanoscale temperature mapping according to the invention. FIG. 7B is an enlarged schematic view of the fiber probe adjacent the surface to be measured of FIG. 7A. The system 2 includes an optical fiber 4, specifically, in at least one embodiment, an IR-tuned optical fiber ("IR fiber"). IR fiber is fiber that is made with material that has low optical absorption and high transmission in the IR range, for example, fluoride, chalcogenide and silver halide. For example and without limitation, an IR fiber could be turned for mid-IR frequencies of about 2-10 micrometers.

In at least one example of an embodiment, the system can include a scanning tunneling microscope system. The IR fiber can be coupled to an actuator 6 to control probe spacing from the sample and other movement. For example and without limitation, an actuator 6 can include a piezo tube that can expand and contract based on applied electrical energy that can be coupled with a power supply 8 that can establish a tunneling current with a bias voltage to a ground 10 on the sample. The tunneling current can be used to control the distance of the tip 14 (such as the tip apex 16) from the sample. The tip can be formed of various sizes and optimized for the application. For more precise measurements, the tip apex can be controlled to within 1 nm of the sample. Other actuators are contemplated. Equipment such as controllers, sensors, and so forth for the system 2 are not shown but would be known to those with ordinary skill in the art. The spatial resolution of measurements can be less than 100 nm, less than 50 nm, less than 10 nm, less than 5 nm, and less than 1 nm, and anywhere in between.

The tip 14 can include an fiber core 18 that can be coated with a polaritonic coating 20 to receive the near-field energy 22 from the sample 12. For example and without limitation, the polaritonic coating 20 can be formed of a metal such as gold or silver, aluminum zinc oxide ("AZO"), indium tin oxide ("ITO"), other transparent conducting oxides ("TCO") (doped or not doped), vanadium oxide as a transparent carrier-selective material, and other suitable materials that can form polaritons for the system. Once received on the tip, the near-field energy forms polaritons 24 that propagate along the polaritonic coating. For purposes herein, the term "polaritons" include plasmons, phonons, magnons, and other relevant polaritons. The polaritonic coating can be responsive to polaritons at different frequencies depending on the type of polariton. As the polaritons decay along the polaritonic coating, the energy is transferred into the fiber core 18 as emission energy 26 for transmission to a detector 30, such as a spectrometer in spectroscopy. Output can include, without limitation, a spectra line graph, an x-y graph of a two-dimensional surface of the object, or an x-y-z graph of a three-dimensional surface including depth and height of the object, and other outputs as may be suitable for the application.

Figure 8:
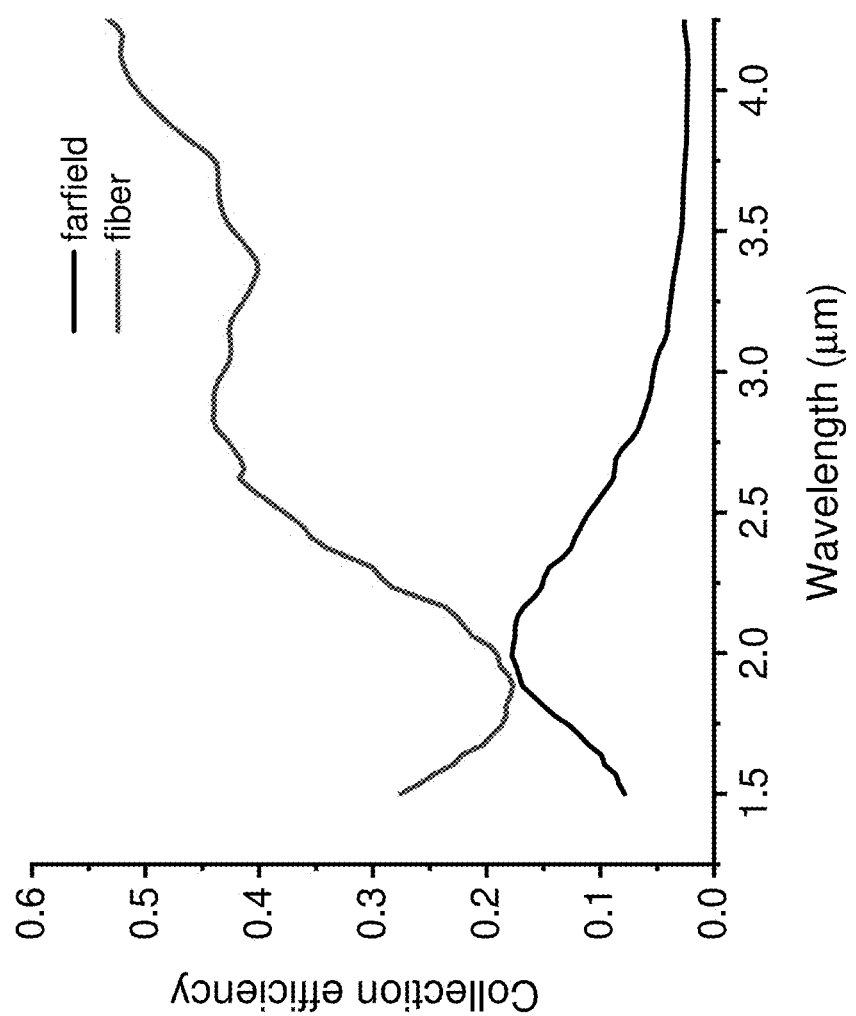
FIG. 8 is a graph of simulated emission collection of energy from a surface by a silver coated polaritonic fiber compared to a thermal radiation scanning tunneling microscope.

FIG. 8 is a graph of simulated emission collection of energy from a surface by a silver coated polaritonic fiber compared to a thermal radiation scanning tunneling microscope. A polaritonic IR fiber probe with silver thin film of about 40 nm according to the invention was simulated for near-field thermal emission collection from a sample. The results were compared with a conventional thermal radiation scanning tunneling microscope. The top line in the graph shows the collection efficiency of the polaritonic IR fiber probe. The bottom line shows the collection efficiency of the objective lens of the known thermal radiation scanning tunneling microscope in the far-field. The efficiency is closest at about a wavelength of 1.8 um. At higher wavelengths, the efficiency diverges significantly where at a wavelength of 4.0 um, the efficiency of the polaritonic IR fiber probe is about an order of magnitude higher than the thermal radiation scanning tunneling microscope in the far-field.

While the above discussion has focused on infrared radiation, other frequency radiative energy can be also measured to yield different characteristics of a material. The wavelengths can vary across a wide range, generally from ultraviolet through microwave. The examples below illustrate a general embodiment adaptable for multiple frequencies and a specific microwave embodiment.

Figure 12A:
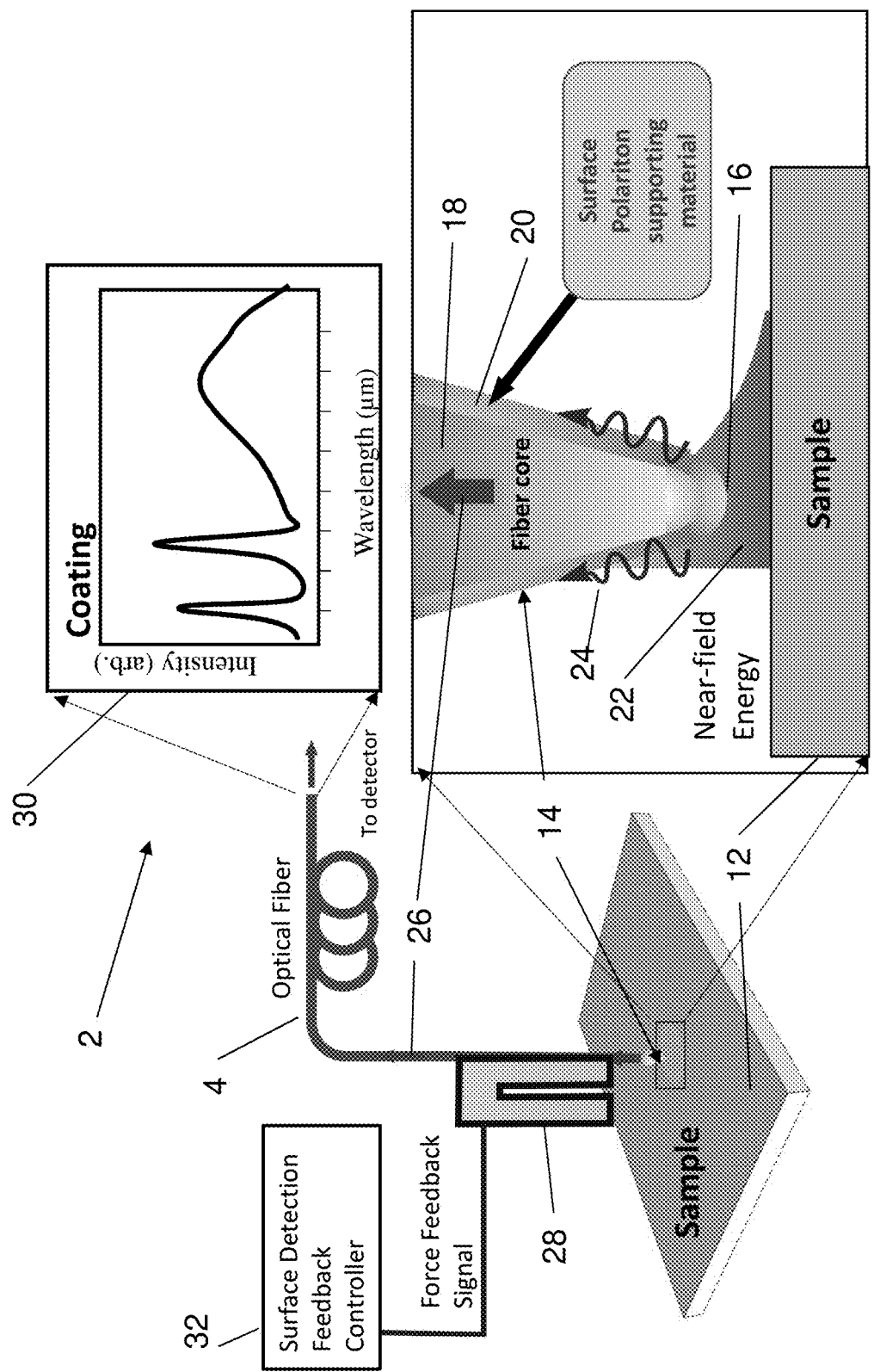
FIG. 12A is a schematic diagram of another illustrative embodiment of a polaritonic fiber probe system capable of nanoscale characterizations according to the invention.

FIG. 12A is a schematic diagram of another illustrative embodiment of a polaritonic fiber probe system capable of nanoscale characterizations according to the invention. Similar to the description of the system in FIG. 7A, the optical fiber 4 can be coupled to a position sensor 28 that provides input to a surface detection feedback controller 32. The controller 32 can control movement of the optical fiber and the distance of the tip 14 (such as the tip apex 16) from the sample 12. For more precise measurements, the tip apex can be controlled to within 1 nm of the sample. Other actuators are contemplated. Other equipment such as other controllers, sensors, and so forth for the system 2 are not shown but would be known to those with ordinary skill in the art. The spatial resolution of measurements can be less than 100 nm, less than 50 nm, less than 10 nm, less than 5 nm, and less than 1 nm, and anywhere in between.

The tip 14 can include the fiber core 18 that can be coated with an polaritonic coating 20 to receive near-field energy 22 from the sample 12. Once received on the tip, the near-field energy forms polaritons 24 that propagate along the polaritonic coating. For purposes herein, the term "polaritons" include quasiparticles that support a surface wave, including but not limited to plasmons, phonons, magnons, and other relevant polaritons. The polaritonic coating 20 can be selected based the wavelength or range of wavelengths being detected. As the polaritons 24 decay along the polaritonic coating 20, the resulting energy is transferred into the fiber core 18 as emission energy 26 for transmission to a detector 30, such as a spectrometer in spectroscopy. Output can include, without limitation, a spectra line graph, an x-y graph of a two-dimensional surface of the object, or an x-y-z graph of a three-dimensional surface including depth and height of the object, and other outputs as may be suitable for the application.

Figure 10A:
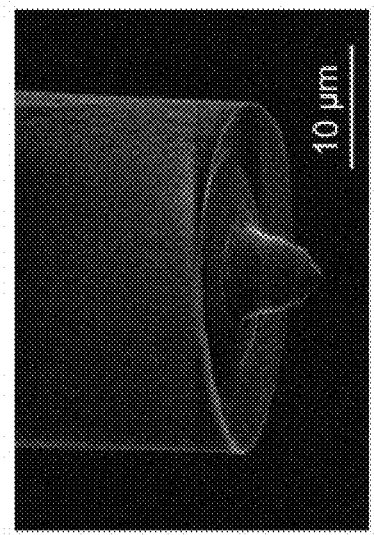
FIG. 10A is a known scanning electron microscope image of an optical fiber probe for ultraviolet frequencies.
Figure 10C:
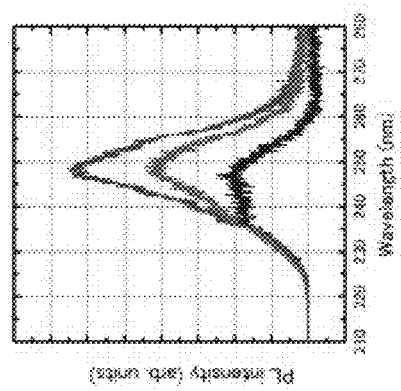
FIG. 10C is a schematic chart of spectral density relative to frequencies from the UV fiber probe measurements of the quantum well structure.
Figure 10B:
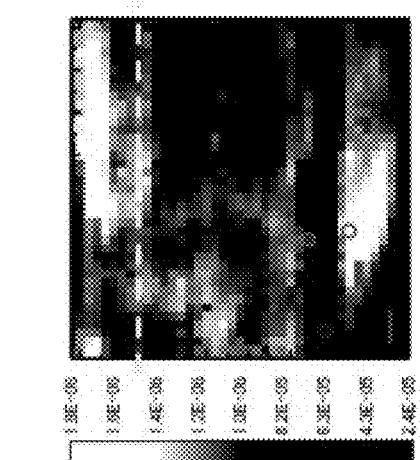
FIG. 10B is a mapping result of aluminum gallium nitrogen quantum well structure using the UV fiber probe of FIG. 10A with a lateral resolution exceeding 150 nanometers.
Figure 11A:
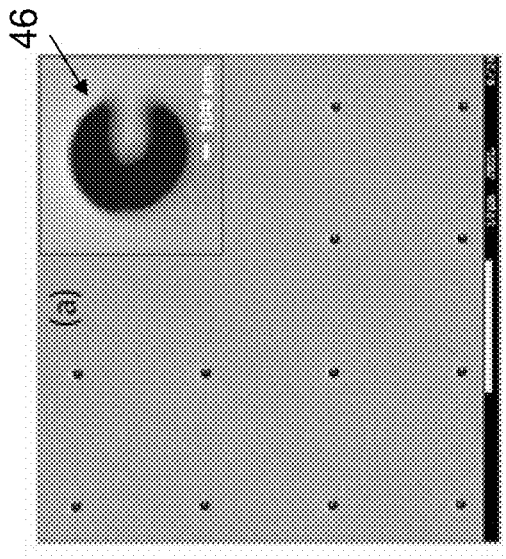
FIG. 11A is a schematic of a known experimental setup for laser pulse through a split-hole resonator.
Figure 11B:
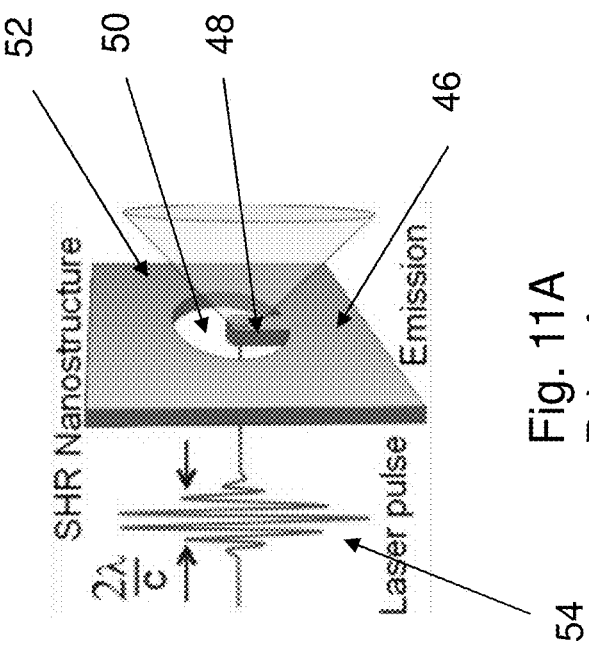
FIG. 11B is a scanning electron microscope image of the split-hole resonator of FIG. 11A.
Figure 11C:
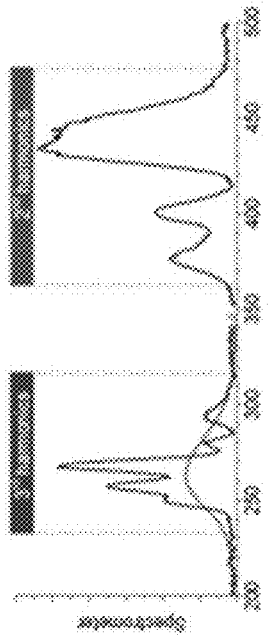
FIG. 11C is a chart of spectra of a second and third harmonics generated by the resonator.
Figures 12B, 12C, 12D:
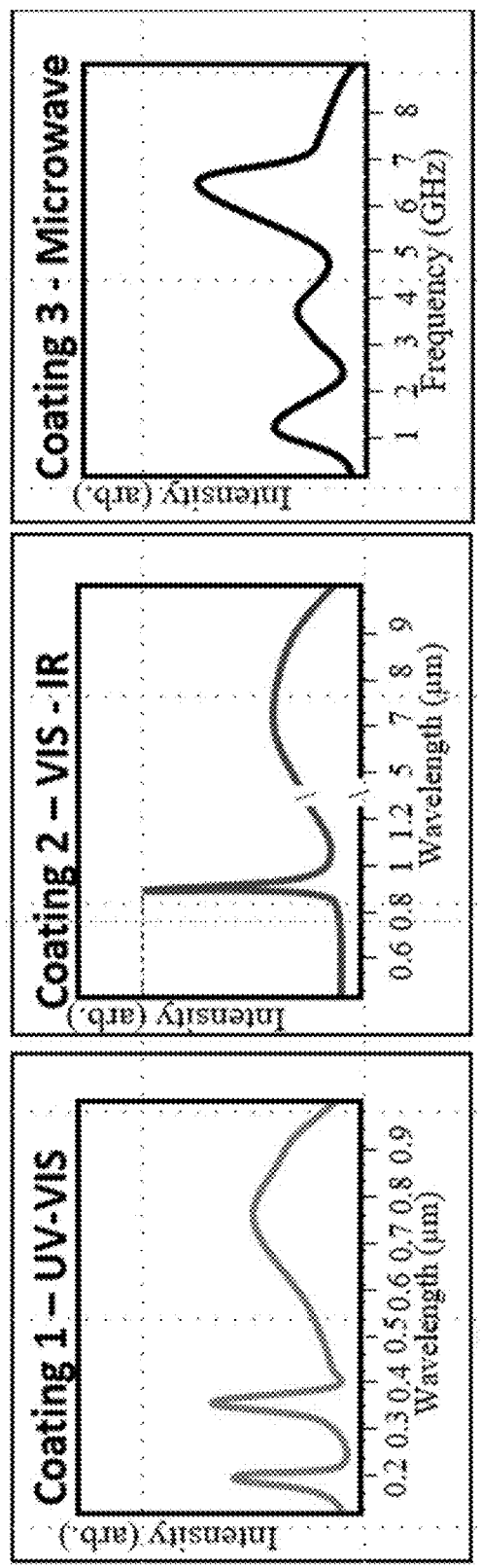
FIG. 12B is a representative display from a detector of a near-field energy results for a wavelength range of UV to visible light.
FIG. 12C is a representative display from a detector of a near-field energy results for a wavelength range of visible light through infrared.
FIG. 12D is a representative display from a detector of a near-field energy results for a wavelength range encompassing microwave.

FIG. 12B is a representative display from a detector of a near-field energy results for a wavelength range of UV to visible light. FIG. 12C is a representative display from a detector of a near-field energy results for a wavelength range of visible light through infrared. FIG. 12D is a representative display from a detector of a near-field energy results for a wavelength range encompassing microwave. Some polaritonic coatings are more appropriate for certain wavelengths or ranges of wavelengths. One or more coatings can be appropriate for one or more ranges or specific wavelengths while other one or more coatings can be appropriate or one or more other ranges or other specific wavelengths. A factor in determining appropriateness is whether the wavelength of the near-field energy (generally producing polaritons) will cause a resonance with the polaritonic coating to exchange energy and excite the polaritons for movement. For example and without limitation, the polaritonic coating 20 can be formed of a metal such as gold or silver, aluminum zinc oxide ("AZO"), indium tin oxide ("ITO"), other transparent conducting oxides ("TCO") (doped or not doped), vanadium oxide as a transparent carrier-selective material, and other suitable materials that can form polaritons for the system. It is understood that other ranges, portions of ranges, expanded ranges and specific ranges or specific wavelengths in one or more the ranges can be selected for near-field energy analysis and the above examples noted in FIGS. 12B-12D and the examples of material for the polaritonic coatings are only illustrative. As one of many examples, the embodiment can have a resolution of one or two (or more) orders of magnitude compared to prior art such as shown in FIGS. 10A-10C regarding UV to visible light near field-energy.

Figure 9A:
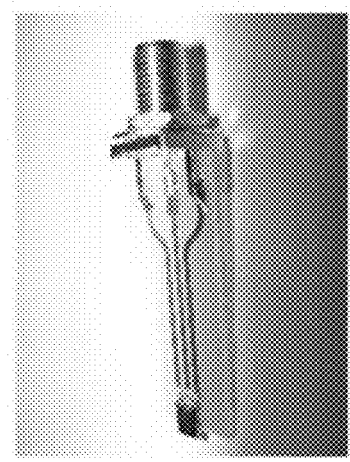
FIG. 9A is a schematic top view of a known microwave co-planar wave probe.
Figure 9B:
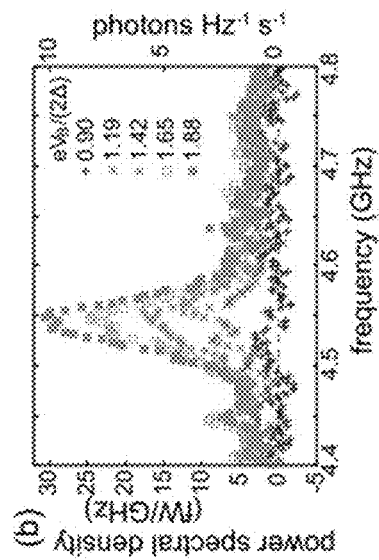
FIG. 9B is a photo of an embodiment of the probe with a PCB connection.
Figure 9C:
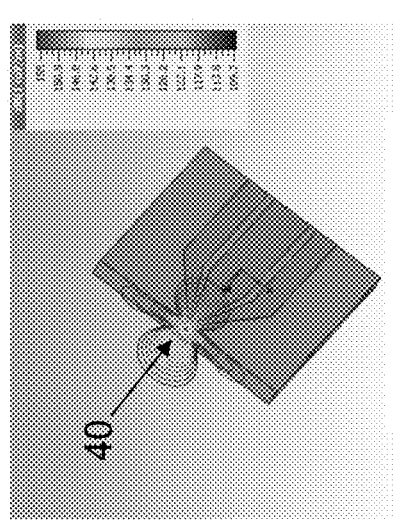
FIG. 9C is a schematic of the co-planar wave probe formed as a funneling resonator.
Figure 9D:
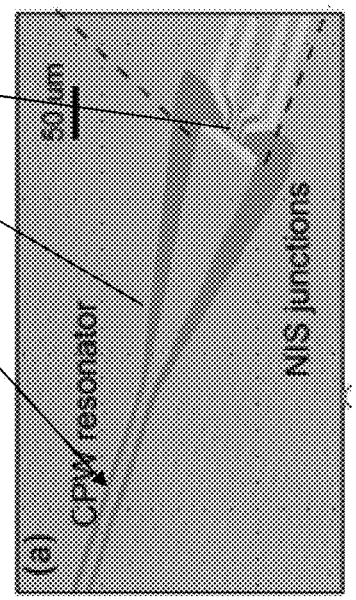
FIG. 9D is a schematic chart of power spectral density relative to frequencies for the resonator of FIG. 9C.
Figures 13A, 13B:
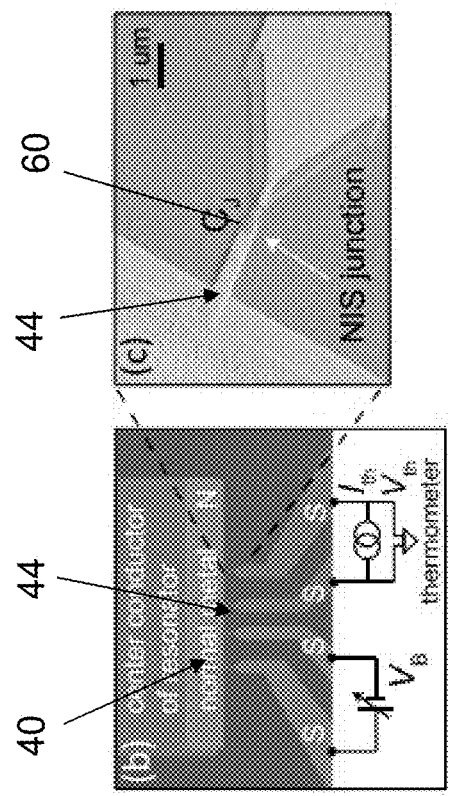
FIG. 13A is a schematic of the co-planar wave probe as an enlarged schematic view of previously described FIG. 9A.
FIG. 13B is a scanning electron microscope image of a Normal-Insulator-Superconductor junction of the center conductor of FIG. 13A.

FIG. 13A is a schematic of the co-planar wave probe as an enlarged schematic view of previously described FIG. 9A. FIG. 13B is a scanning electron microscope image of a Normal-Insulator-Superconductor junction of the center conductor of FIG. 13A. As one of many examples, the invention can be used for measure the near-field energy from the NIS junction on a small nano-scale level.

Figure 14:
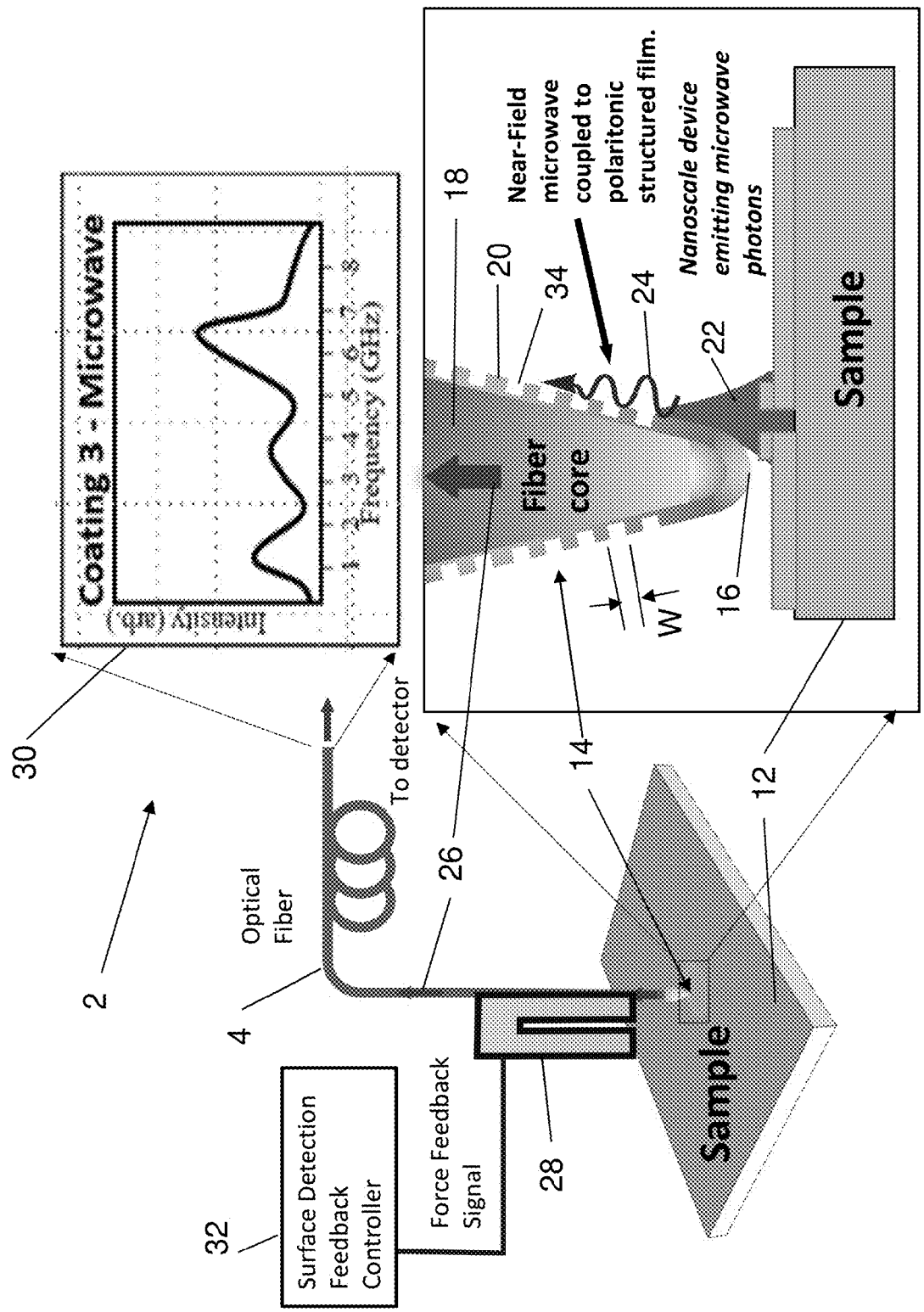
FIG. 14 is a schematic diagram of another illustrative embodiment of a polaritonic fiber probe system capable of nanoscale characterizations according to the invention.

FIG. 14 is a schematic diagram of another illustrative embodiment of a polaritonic fiber probe system capable of nanoscale characterizations according to the invention. This embodiment reflects the embodiments and aspects described relative to FIG. 7A and FIG. 12A. However, the tip 14 can be configured particularly for microwave polaritons as plasmons or magnons. Generally, the tip 14 can include the fiber core 18 that can be coated with a polaritonic coating 20 to receive near-field energy 22 from the sample 12. The polaritonic coating 20 can be formed as a structured surface to efficiently support polaritons along the surface. Slits 34 formed in the coating 20 can form the structured surface coating. The slits 34 can have a width W that is smaller than the wavelength of the near-field energy being coupled with the polaritonic coating 20.

Once received on the tip, the near-field energy forms polaritons 24 that can propagate along the polaritonic coating 20. As the polaritons 24 decay along the polaritonic coating 20, the resulting energy is transferred into the fiber core 18 as emission energy 26 for transmission to a detector 30, such as a spectrometer in spectroscopy. Output can include, without limitation, a spectra line graph, an x-y graph of a two-dimensional surface of the object, or an x-y-z graph of a three-dimensional surface including depth and height of the object, and other outputs as may be suitable for the application.

Other and further embodiments utilizing one or more aspects of the inventions described above can be devised without departing from the disclosed invention as defined in the claims. For example, different structures, diameters, shapes, angles, wavelengths, coatings, material, and other parameters provided in this application can vary and are limited only by the scope of the claims.

The invention has been described in the context of one or more embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

The invention claimed is:

1. A system for measuring an object having a surface, comprising:
   a probe formed of an optical fiber configured to conduct emission from the object comprising:
   a portion of the optical fiber forming a tip;
   a polaritonic coating on the optical fiber tip configured to receive near-field energy from the surface and form polaritons responsive to a radiation that propagates along the polaritonic coating; and
   wherein the fiber is configured to allow the polaritons to decay into the fiber and transmit emission from the decayed polaritons along the fiber.

2. The system of claim 1, wherein the near-field energy is directly coupled into the polaritons on the polaritonic coating.

3. The system of claim 1, further comprising a detector configured to detect emissions from the polaritons.

4. The system of claim 1, further comprising an actuator coupled to the probe and configured to move the probe in relation to an energy between the actuator and the object surface.

5. The system of claim 1, wherein a spatial resolution of the probe is at least less than 100 nm.

6. A method of measuring an object, comprising:
   placing a probe and the object having near-field energy adjacent each other, the probe having a polaritonic coating configured to receive the near-field energy;
   allowing the near-field energy to form polaritons on the polaritonic coating;
   allowing the polaritons to propagate along the polaritonic coating;
   allowing the polaritons to decay and emit energy into the fiber;
   conducting the emitted energy along the fiber; and
   detecting the energy in the fiber from the decayed polaritons.

7. The method of claim 6, further comprising directly coupling the near-field energy into polaritons on the polaritonic coating.

8. The method of claim 6, further comprising controlling a distance between a tip of the probe and the object surface with a tunneling current.

9. The method of claim 6, wherein detecting the energy comprises generating an emission spectral display.

10. The method of claim 6, wherein detecting the energy in the fiber from the decayed polaritons comprises detecting at less than 100 nm spatial resolution.

* * * * *

UNITED STATES PATENT AND TRADEMARK OFFICE
CERTIFICATE OF CORRECTION

PATENT NO. : 11,841,274 B2
APPLICATION NO. : 17/498459
DATED : December 12, 2023
INVENTOR(S) : Zhenrong Zhang et al.

It is certified that error appears in the above-identified patent and that said Letters Patent is hereby corrected as shown below:

In the Specification
In Column 2, Line 33, delete "n1204201g)." and insert -- nl204201g). --, therefor.

Signed and Sealed this
Twenty-eighth Day of May, 2024

Katherine Kelly Vidal
*Director of the United States Patent and Trademark Office*